C. D. TRUSSELL.

TEMPORARY BINDER.

APPLICATION FILED OCT. 1, 1921.

Reissued Mar. 28, 1922.

15,322.

2 SHEETS—SHEET 1.

Inventor:

Clarence D. Trussell,

By Attorneys,

Fraser, Turk & Myers.

C. D. TRUSSELL.

TEMPORARY BINDER.

APPLICATION FILED OCT. 1, 1921.

Reissued Mar. 28, 1922. 15,322.

2 SHEETS—SHEET 2.

*Inventor:*
*Clarence D. Trussell,*
*By Attorneys,*
*Fraser, Turk & Myers.*

UNITED STATES PATENT OFFICE.

CLARENCE D. TRUSSELL, OF POUGHKEEPSIE, NEW YORK, ASSIGNOR TO TRUSSELL MANUFACTURING COMPANY, OF POUGHKEEPSIE, NEW YORK, A CORPORATION OF NEW YORK.

TEMPORARY BINDER.

15,322. Specification of Reissued Letters Patent. Reissued Mar. 28, 1922.

Original No. 1,180,342, dated April 25, 1916, Serial No. 763,971, filed April 28, 1913. Application for reissue filed October 1, 1921. Serial No. 504,773.

*To all whom it may concern:*

Be it known that I, CLARENCE D. TRUSSELL, a citizen of the United States, residing in Poughkeepsie, in the county of Dutchess and State of New York, have invented certain new and useful Improvements in Temporary Binders, of which the following is a specification.

The invention aims to provide certain improvements in temporary binders such as are commonly used for blank books, account books and the like.

The object of the invention is to provide a simple, strong and attractive construction which has certain other advantages specified more fully hereinafter.

The accompanying drawings illustrate an embodiment of the invention.

Referring now to the embodiment of the invention illustrated, the back A and side covers B are made of a single ply integral piece of leather or similar flexible material, as described in my application No. 469,226, filed December 26, 1908, Patent No. 1,104-394, July 21, 1914. This piece of leather is provided with grooves C extending partly through the thickness of the leather so as to form two weakened lines for the bending or hinging of the flexible covers relatively to the back, these lines extending nearly but not quite to the top and bottom edges of the covers. The loose leaf binding mechanism is then fastened upon the inner side of the back between the covers in any one of various ways. The foregoing features have numerous points of great advantage, as set forth at length in my aforesaid application.

One feature of improvement in the present construction is the mode of attaching the loose leaf binding mechanism to such a back and covers. This is done by providing a strip D of flexible material, such as heavy cloth, which is fastened to the mechanism and has its side edges projecting beyond the mechanism and fastened to the leather covers or back by lines of stitching E, which may pass through the weakened lines C or be located alongside such lines. For greater strength it is preferable to use a two-needle machine for this stitching. The strip D is a band of heavy cloth or the like which passes between the back plate F of the loose leaf mechanism and a similarly curved binding plate G, these two plates F and G being fastened to each other near their ends and at other suitable points according to their lengths by means of tongues H bent upward from the binding plate G, and extending through the strip of cloth D and through notches in the back plate F of the loose leaf mechanism, and bent over the latter to clamp the several parts together.

Figure 1:
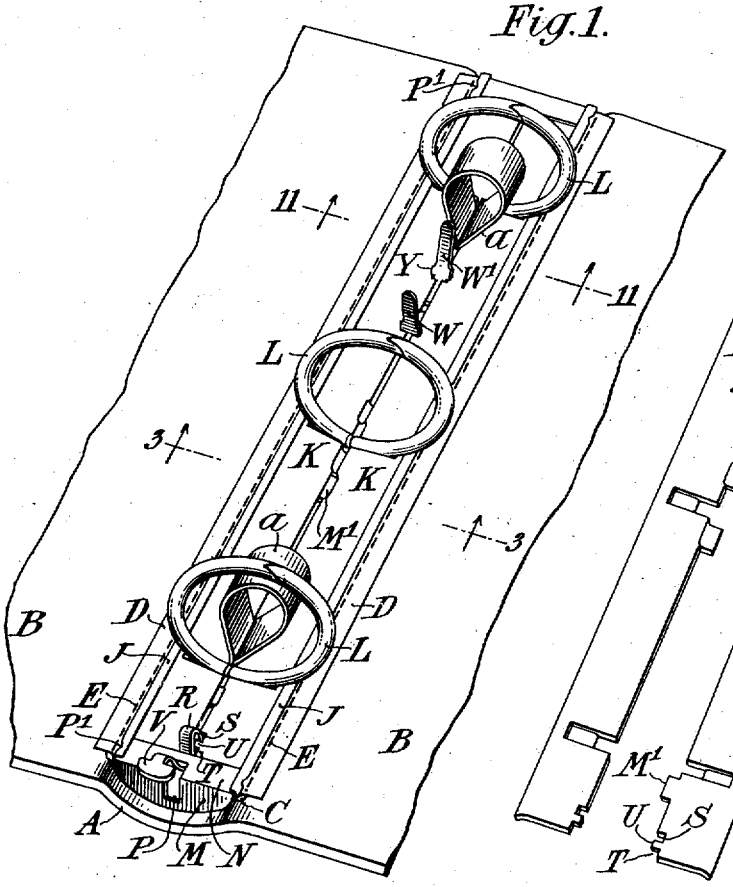
Figure 1 is a perspective of the binding mechanism attached to the cover and back of the book, but with the leaves omitted.
Figure 2:
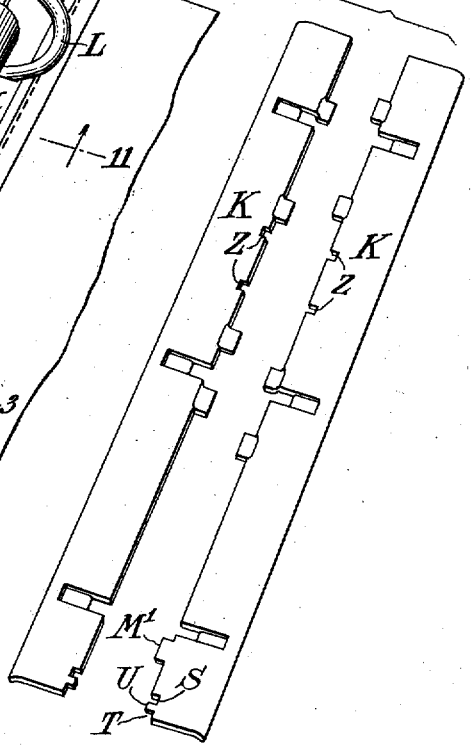
Fig. 2 is a perspective view of the two ring-carrying plates.
Figure 3:
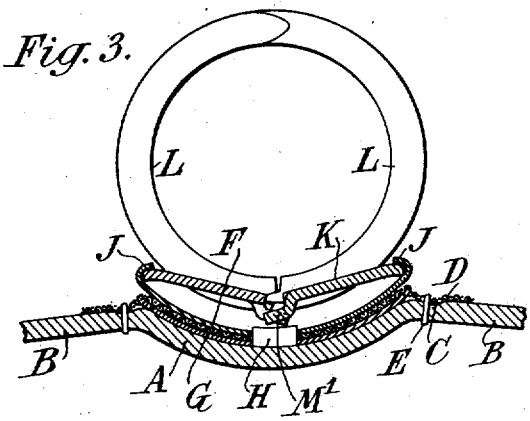
Fig. 3 is a transverse section on the line 3—3 of Fig. 1.
Figure 4:
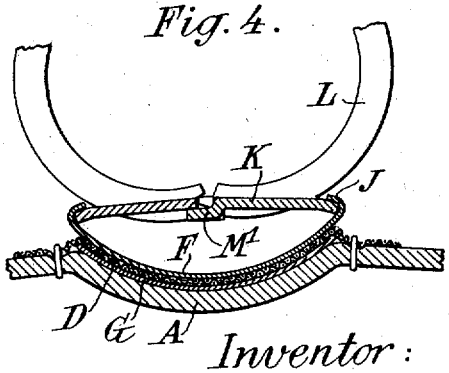
Fig. 4 is a similar section with the parts in another position.
Figure 5:
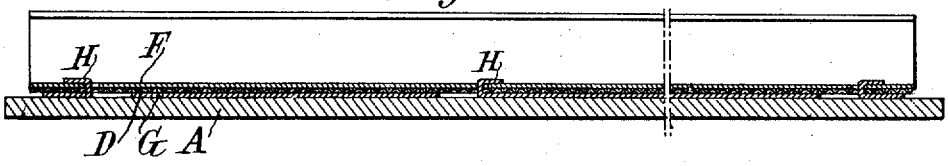
Fig. 5 is a longitudinal section through the back of the book and the back of the loose leaf mechanism.
Figure 6:
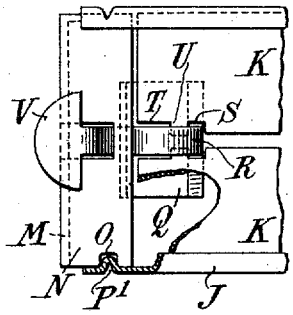
Fig. 6 is a plan, partly in section, of one end of the mechanism.
Figure 9:
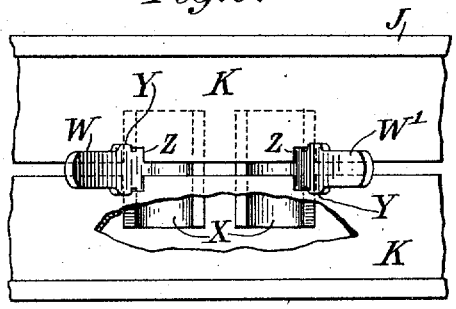
Fig. 9 is a plan, partly broken away, of an intermediate part of the mechanism carrying a pair of intermediate ring-opening levers.

The loose leaf mechanism comprises the curved back plate F of spring material having inwardly bent edges J and plates K carrying the prongs or rings L. The prongs are fastened to the plates in any suitable way, as for example, in the manner shown in my Patent No. 959,182, and the prongs of each pair are in pivotal engagement at their lower ends, the plates K being located between the edges of the spring back plate, so that the pivotal ends of the prongs are always pressed against each other. When the prongs are brought into engagement at their upper ends the plates K lie in their lowered position, Fig. 3, with their inner edges below the line connecting their upper edges, so that the spring pressure tends to hold them in this position, the contact between the upper ends of the prongs preventing any further downward movement. When the plates are forcibly lifted, Fig. 4, to bring their inner edges above the line between their outer edges, the spring pressure of the back plate holds them in this position, further upward movement being prevented by means of projecting tongues M′ on the edges of the plates. The tongues from one plate project under the opposite plate and thus prevent further upward movement. The arrangement and location of these tongues, and the design of the plates K for permitting attachment of the prongs, and the operating levers hereinafter referred to are shown fully in Fig. 2. In order to improve the appearance of the mechanism and to cover the ends of the same I provide at one end or at each end a piece for closing the space between the back plate and the ring-carrying plates. For example, in the construction illustrated, I provide a plain end-piece at one end, and a notched end-piece at the other end, the latter being notched to accommodate an opening lever hereinafter referred to. Each of these end-pieces comprises a plate M shaped to extend across the space to be closed, and having a top flange N which extends approximately to the ends of the plate K and which is provided with notches O (Fig. 6) adapted to be engaged by similar projections P′ formed in the edges of the curved spring plate. The spring plate F extends beyond the ends of the ring-carrying plates K and the flange N of the end-piece is gripped between the flanges J of the spring plate, so that as the end-piece is inserted the part N, engaging the projections P′, forces the flanges J outward until the recesses O come into register with the projections P′, whereupon the latter spring into the recesses and lock the parts together, so that the end-piece is held in place with an impositive spring lock.

Figure 7:
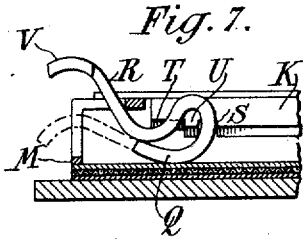
Fig. 7 is a longitudinal section of the same.
Figure 10:
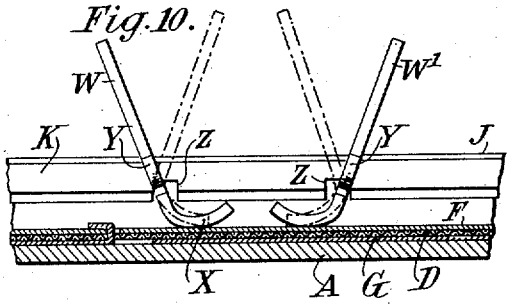
Fig. 10 is a longitudinal section of the same.
Figure 8:
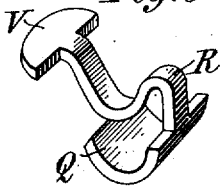
Fig. 8 is a perspective view of the end lever for opening the rings.

The end-piece at the lower end of the mechanism is formed with a notch P in which is guided an end lever for opening the rings, the finger portion only of such lever being extended outward beyond the end-piece N. This end lever, for opening the rings, is shown more fully in Figs. 6, 7 and 8. The lever has a comparatively broad, inner end portion Q which bears against the back plate and the upper edge of which forms a pair of shoulders engaging the under sides of the ring-carrying plates K. The lever is then formed with a narrow intermediate portion R which passes upward through notches S in the edges of the plates K, and thence downward through notches T so as to embrace the tongues U which are formed by said notches. The portion R then passes through the guiding notch P in the end-piece M, N, and is preferably broadened again to form the finger-piece V. By the construction described the lever is housed or attached to the ring-carrying plates through the tongues U, entering the loop in the intermediate portion R of the lever, and the broad, inner end Q of the lever simply bears against the back plate with a camming action, as shown by the full and dotted lines in Fig. 7. The end portion Q of the lever is curved in such a way that practically from the beginning to the end of the downward movement of the finger end of the lever the rate of movement of the shoulders which bear against the under side of the plates K bears a constant relation to the rate of movement of the finger-end V. This result cannot be secured by a simple lever movement because, as is well known, the angle of application of the lever to the work varies and thus the rate at which the load is being moved varies in different positions of the lever. This is a material disadvantage in levers for operating the loose leaf mechanism. It is advantageous to secure, as is done with the lever herein described, a practically constant pressure of the operator's finger on the lever throughout the movement of the latter. Such devices are necessarily limited to a short lever and a short movement. If the lever does not move with an easy action and substantially uniform pressure, the book is apt to be condemned; and an easy action cannot be obtained if the pressure required to raise the plates is mostly encountered over only a part of the movement of the finger end of the lever.

Figure 11:
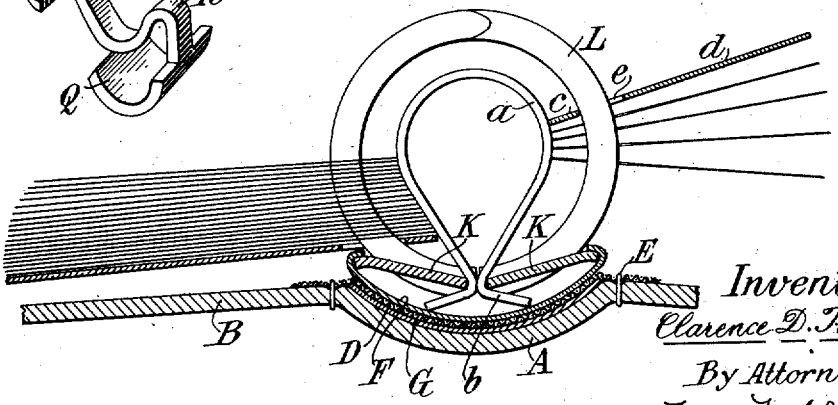
Fig. 11 is a transverse section approximately on the line 11—11 of Fig. 1.

Another feature of the improvement, which is especially applicable to books of the larger size, is the provision of one or more opening levers at an intermediate point in the length of the plates. In such a position an opening lever gives better results than if located at the end, for the reason that the pressure comes nearer the middle of the plates and therefore is less apt to twist the plates. The finger portion of such an intermediate lever may be located within the space defined by the inner edges of the leaves, as indicated in Fig. 11. Such intermediate opening means is preferably provided in addition to the end lever previously described. In the example illustrated two levers W W′ are provided, so located as to be easily pressed with one hand, being gripped between the thumb and finger and pressed toward each other to raise the plates. Each of these levers works on the same general principle as the end lever. It is provided with a broad, inner end X bearing against the back plate and having shoulders engaging the under sides of the ring plates K, from which shoulders a narrower portion extends outward through notches in the plates K, and forms the outer finger end. The projecting portions W and W′ are slightly broadened as at Y beyond the plates K to prevent them from slipping downward through the notches Z in said plates when the plates are raised.

There are certain purposes for which books of the divided-ring type are not used, because the holes in the sheets are so much larger in diameter than the rings that they permit a considerable movement of the sheets. Comparatively large holes in the sheets are necessary in order to permit their easy introduction and withdrawal. I have, however, provided means whereby the sheets may be provided with holes as large as usual but after they are placed upon the rings their movement is limited so as to be very slight or to be practically eliminated. For this purpose I provide an alining means adapted to be engaged by the inner edges of the sheets. In the form illustrated the alining means comprises a pair of plates *a* of spring metal extending downward between the ring-carrying plates K and having end flanges *b* by which they are held in place, and kept centered while in use, the intermediate portions of such plates being bent in curves approximately concentric with the rings L and smaller than such rings, being displaced therefrom by distances (measured in the planes of the leaves when lying flat, the book being open) substantially equal to the width of the margins *c* of the leaves *d*, whereby the latter are held as far outward from the center as the engagement of the rings with the holes *e* therein will permit. The aliners *a*, being of spring metal, are adapted to yield a little but they will hold with sufficient firmness for practical purposes, and it will be observed that they are in contact on opposite sides with the edges of the leaves. Thus the marginal portions *c* between the edges of the leaves and the nearest edges of the holes are confined between the rings and aligners. In Fig. 11 one of the sheets *d* is shown of exaggerated thickness and in cross-section so as to indicate the mode of operation. When the rings L are opened there is a large clearance between these rings and the aliners *a* so that there is no difficulty whatever in introducing the sheets. After the sheets are introduced the closing of the rings brings their edges against the aliners and prevents any substantial play of the leaves. The aliners also have the advantage of guiding the inner edges of the sheets in turning over the leaves and in closing the book.

Though I have described with great particularity of detail certain specific embodiments of each of the features of improvement of this invention, yet it is not to be understood therefrom that the invention is restricted to the specific constructions illustrated. Various modifications thereof in detail and in arrangement and combination of the parts may be made by those skilled in the art without departure from the invention.

I claim as my invention:

1. A temporary binder including in combination a curved spring back plate, a pair of ring-carrying plates extending between the edges of said back plate, and an end piece closing the space at the end between said back plate and said ring-carrying plates, said end piece being fastened to said back plate with a spring lock.

2. A temporary binder including in combination a curved back plate, a pair of ring-carrying plates extending between the edges of said back plate, and an end piece closing the space at the end between said back plate and said ring-carrying plates, said back plate extending beyond the ends of said ring-carrying plates and said endpiece having a flange lying between the extended edges of said back plate and said end-piece being fastened to the extended portion of said back plate.

3. A temporary binder including in combination a back plate, a pair of ring-carrying plates extending between the edges of said back plate and adapted to be raised or lowered to open or close said rings, and a lever for raising said ring-carrying plates, said lever having an inner end portion bearing against said back plate and engaging the under sides of said ring-carrying plates and having an intermediate portion engaging the inner edges of said plates and having an outer end portion forming a finger-piece.

4. A temporary binder including in combination a back plate, a pair of ring-carrying plates extending between the edges of said back plate and adapted to be raised or lowered to open or close said rings, and a lever for raising said ring-carrying plates, comprising a wide inner end portion Q bearing against the back plate, and the upper edge of which forms shoulders engaging the under side of the ring-carrying plates, a narrow intermediate portion R passing upward through notches in the edges of said ring-carrying plates, and a finger end at the outer end of said intermediate portion.

5. A temporary binder including in combination a back plate, a pair of ring-carrying plates extending between the edges of said back plate and adapted to be raised or lowered to open or close said rings, and a lever for raising said ring-carrying plates, said lever being located in the space between two of the rings and adapted to be within the space defined by the inner edges of the leaves.

6. A temporary binder including in combination a back plate, a pair of ring-carrying plates extending between the edges of said back plate and adapted to be raised or lowered to open or close said rings, and a pair of levers for raising said ring-carrying plates, said levers being so located as to be easily pressed with one hand, and said levers being adapted to raise said plates by moving one in one direction and the other in the opposite direction.

7. A temporary binder including in combination rings adapted for carrying perforated sheets, ring-carrying plates hinged at their outer edges and adapted to be raised or lowered at their inner edges to open or close said rings, and alining means adapted to be engaged by the inner edges of such sheets to limit the movement thereof on the rings when the latter are closed, said alining means comprising plates passing between the inner edges of said ring-carrying plates and bent in curves approximately concentric with the rings.

8. In a ring binder in combination, movable ring-carrying plates, a back plate and an aliner engaged by said ring-carrying plates and having flanges adapted to bear on said back plate for holding it centrally when the rings are closed.

9. A temporary binder in book form comprising rings for carrying perforated sheets formed of half-rings abutting when closed, plates carrying such half-rings movable to open and close the rings, and alining means adapted to be engaged by the inner edges of such sheets when the book is open and the sheets laid flat, to limit the movement thereof on the rings when the latter are closed.

10. A temporary binder in book form comprising abutting half-rings and carrying means therefor, the half-rings when closed together constituting substantially complete rings of approximately circular form, and their carrying means located so remote from their abutting ends as to leave a substantial portion of the rings below the ring-center free for engagement by the perforated sheets to be bound, combined with alining means for such sheets consisting of aliners attached to the binder in positions operative, when the rings are closed and the sheets laid out flat, to bear against the inner edges of the sheets and hold them outward to prevent any substantial play of the sheets.

In witness whereof I have hereunto signed this specification.

CLARENCE D. TRUSSELL.